3 Sheets—Sheet 1.
A. H. ALLEN.
Opera Chair.
No. 1,126.
Reissued Jan'y 15, 1861.
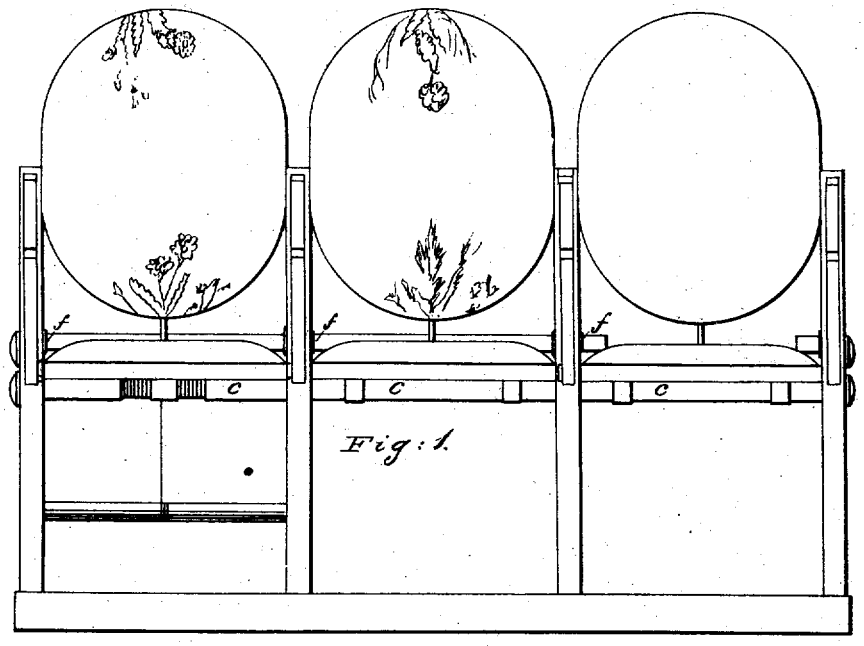
Fig: 1.
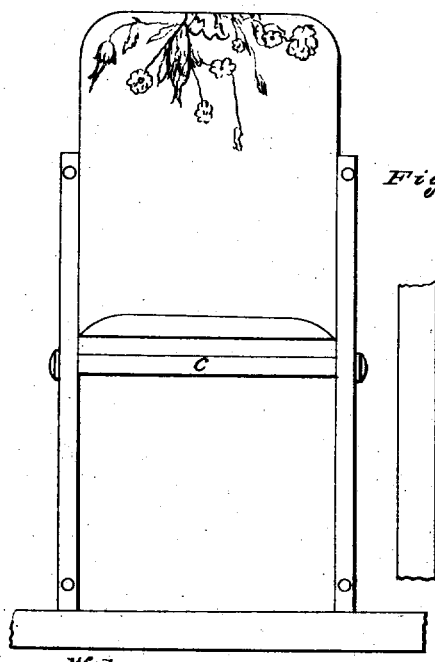
Fig: 6.
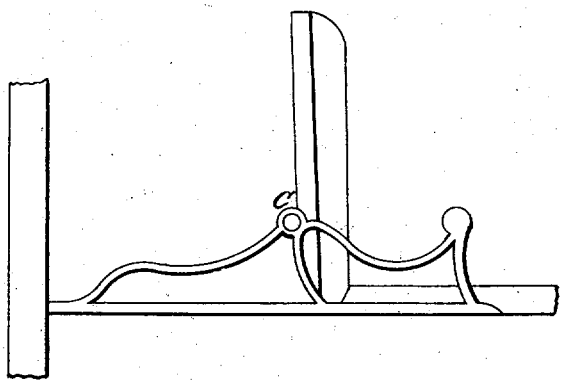
Witnesses:
J. P. Bradbury.
G. B. Roble.
Inventor:
Aaron H. Allen.
N. PETERS, Photo-Lithographer, Washington, D. C.

3 Sheets—Sheet 2.
A. H. ALLEN.
Opera Chair.
No. 1,126. Reissued Jan'y 15, 1861.
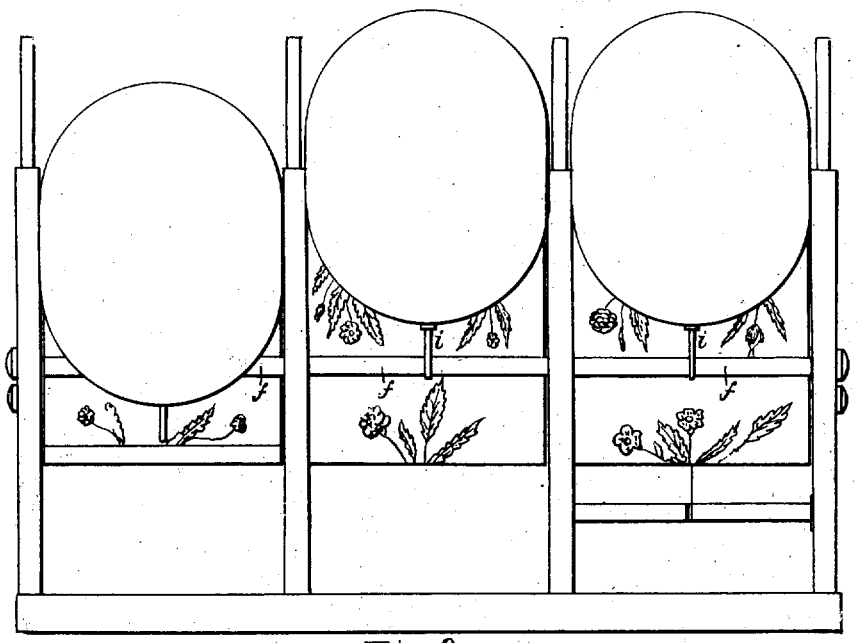
Fig: 2.
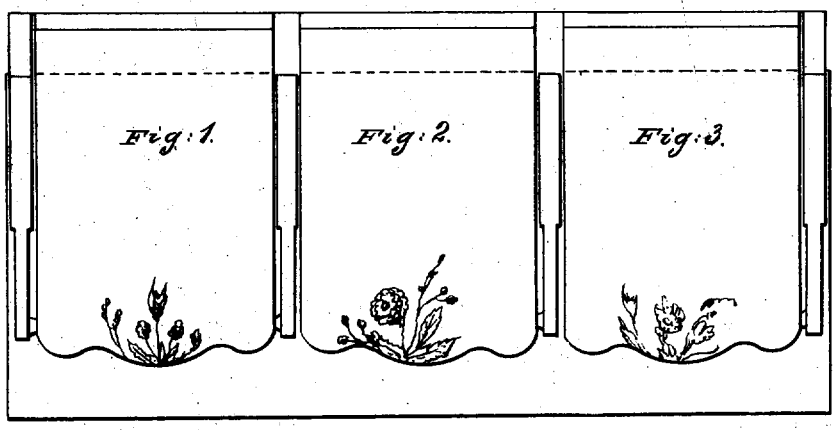
Witnesses:
J. P. Bradbury.
H. B. Robb.
Inventor:
Aaron H. Allen.
N. PETERS, Photo-Lithographer, Washington, D. C.

A. H. ALLEN.

Opera Chair.

No. 1,126.

Reissued Jan'y 15, 1861

Witnesses:

J. P. Bradbury.

Geo. B. Robb.

Inventor:

Aaron H. Allen

N. PETERS, Photo-Lithographer, Washington, D. C.

UNITED STATES PATENT OFFICE.

AARON H. ALLEN, OF BOSTON, MASSACHUSETTS.

IMPROVEMENT IN SEATS FOR PUBLIC BUILDINGS.

Specification forming part of Letters Patent No. 12,017, dated December 5, 1854; Reissue No. 1,126, dated January 15, 1861.

*To all whom it may concern:*

Be it known that I, AARON H. ALLEN, of the city of Boston, Commonwealth of Massachusetts, have invented a new and useful Improvement on Opera-Seats; and I do hereby declare that the following, taken in connection with the accompanying drawings, which form part of this specification, is a full and clear description thereof.

The nature of my invention consists in a seat set and moving upon a cross-shaft or hinge in such manner as that the seat or front sitting portion thereof can be turned up or elevated to afford room in passing into or out of the seat or past it, and said seat forming a lever that when down or adjusted to a sitting-level strikes and is supported by a stop, which may be located in rear of the seat-fulcrum, and serves to sustain the seat and person occupying the same, the seat being extended backward in rear of its fulcrum and coming up under said stop. Such seat may be counterpoised so as to assume and retain a vertical or nearly vertical position when raised or not in use.

To enable others to make and use my invention, I will now proceed to more minutely describe it.

Figure 3:
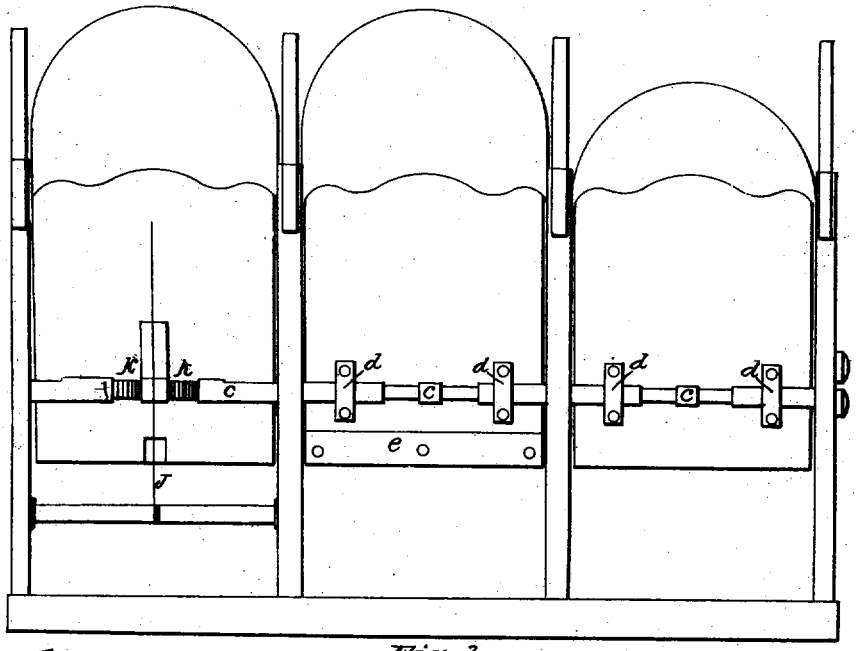
Figure 4:
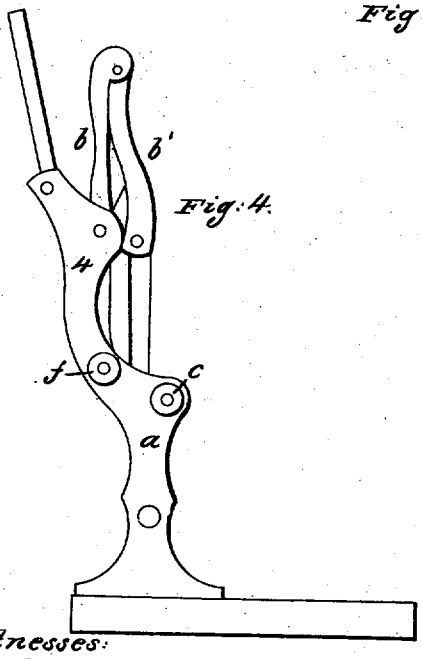
Figure 5:
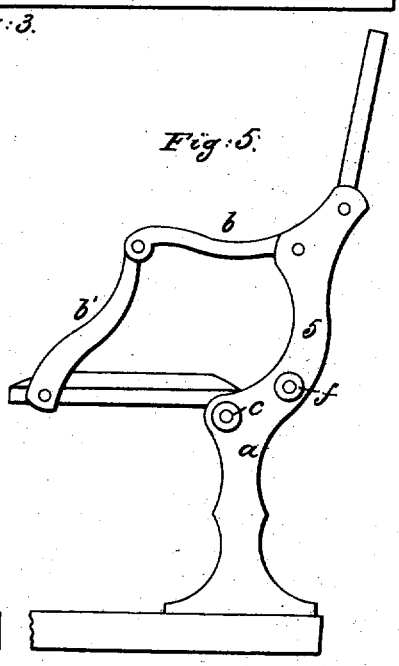

In Figures 4 and 5 of the accompanying drawings, which represent side elevations of a seat constructed according to my improvement, and show the same when let down and when raised, the standard or standards *a* may be secured to the floor like the frame or standards of opera-seats heretofore in use; but they differ or may differ therefrom in providing the part to which the arm is attached with a mortise or slot to receive the end of the jointed arm of the seat. Each arm may be formed of two pieces—namely, a rest or arm piece, *b*, and standard-piece *b'*, jointed together at the scroll. The lower end of said standard-piece is attached to the seat by a pin, forming a hinge or joint. The rest piece *b* of the arm is hung or inserted in the mortise or slot of the frame or standard previously referred to, and is secured therein by a pin passing through it and serving as a pivot, to allow the end of the seat to rise and fall, as hereinafter described. These several attachments of parts may be made by hinges or other analogous devices. The seat proper is hinged to the standards by, say, a shaft, *c*, extending from one standard to the other, (see Figs. 1 and 3,) and may be secured thereto by metal straps (marked *d* in Fig. 3) bent around said shaft and fastened by bolts or screws to the seat. By these means the seat is allowed to rise and fall on or around the shaft as a fulcrum or center of motion. Said seat may be connected with said shaft at about one-third of the distance (more or less) from the back end of the former; or, in other words, the seat may be formed with a back extension-piece of about one-third the length of the seat, when it is designed that the stop to the seat should be in rear of the fulcrum to the latter, which is the arrangement here shown. The stop *f* (see Figs. 1, 2, 4, and 5) may be a shaft extending from one standard to the other, and be located far enough above and back of or otherwise relatively to the fulcrum *c* of the seat as to admit of the back end of the seat resting and pressing upward against said stop when the seat is in a horizontal position, by means of which the seat is made to sustain its weight and that of the person occupying it, and whereby any support to the seat at its front end is dispensed with.

Figs. 1, 2, 3, 5, and 6 in the accompanying drawings represent front and rear elevations, plan, and side view of the seat, also a combination or row of such seats, with certain additions, modifications, or parts not shown in Figs. 4 and 5.

In Fig. 3 of said drawings the seat proper is shown as provided at its back end with a weight, *e*, so that when the seat is relieved of pressure upon it it will rise from the horizontal to the vertical position. The same effect may be accomplished by springs instead of weights, in which case the spring or springs may be disposed around or upon the fulcrum *c*, and be spiral or otherwise, K K in Fig. 3 illustrating spiral springs as so arranged. Instead of springs or weights, however, to accomplish the same result, the back of the seat may be weighted and allowed to move upward and downward in grooves formed in the standards by a pin or pins projecting from each side of the back into the groove or grooves of the standards, and the lower end of the back be attached to the back end of the seat by hinges or other analogous devices; or it may rest upon it without being attached thereto, so that the back, being heavier than that part of the seat which extends beyond the fulcrum, will, when the seat is relieved from pressure upon it, fall until the pin or pins before mentioned rest upon the lower end of the groove or grooves, and thus cause the seat to rise automatically. When the weight or spring *e k*, Fig. 3, is used, the back may be suspended and attached to the seat-standards by a pin on each side projecting from it about midway, and allowing the back to move on said pin as a pivot, the lower end of the back being attached to the stop or shaft *f* by a spring, *i*, as shown in Fig. 2. This retains the back in its place when the seat is not in use, and gives flexibility to make it adjustable and yielding to the movement of the body when the seat is in use.

To give additional support to the seat, a brace may be formed upon the shaft or foot-rest, as shown in Fig. 3, and extending from it to a bar or slide on the under part of the seat and attached to it, as shown in the drawings and marked *j* in Fig. 3. For this purpose also the standard-piece of the arm may be extended so as to rest on the floor when the seat is in a horizontal position. The standard may be made as shown in Fig. 6, and the jointed arm dispensed with.

When there are a series of seats in a row, a continuous shaft or fulcrum may be used by forming on the end of each alternate section a screw arranged to pass through the frame or standard into a screw-box or female thread connected with each adjoining section.

The automatic elevation of the seat when relieved of pressure may be dispensed with and the seat be raised by hand; but when so raised it should, as shown in Fig. 4 of the drawing, occupy such a vertical position as will keep it raised till purposely lowered again.

What is here claimed as new and useful is—

A swinging or lever seat set and moving upon a cross-shaft or hinges, and sustained when in use by a stop or stops so disposed as that the rear portion of the seat comes in contact with said stop or stops when the seat is turned down, substantially as herein set forth, and whether combined or not with weights or springs, whereby the said seat may assume and retain a vertical or raised position automatically, as herein specified.

A. H. ALLEN.

Witnesses:
JOSEPH GAVETT,
A. W. BARKER.